United States Patent Office 2,855,660
Patented Oct. 14, 1958

2,855,660

AUSTENITIC MANGANESE STEEL WELD DEPOSIT

William T. De Long and William L. Lutes, West Manchester Township, York County, Pa., assignors to The McKay Company, Pittsburgh, Pa., a corporation of Pennsylvania No Drawing. Application May 6, 1957
Serial No. 657,025

4 Claims. (Cl. 29—194)

This invention relates to an austenitic manganese steel weld deposit. It has to do particularly with a discovery which we have made whereby we produce an austenitic manganese steel weld deposit having unforeseeable advantages by maintaining the phosphorus content of the weld deposit not over about .035%.

It is very well known to those skilled in the art that phosphorus is detrimental to an austenitic manganese steel weld deposit. Specifications for welding electrodes for the production of such deposits for either surfacing or joining customarily require the phosphorus content to be not over .07%; a steel mill specification for the standard core wire for a coated welding electrode typically limits the phosphorus content of the core wire to a maximum of .07%. Those skilled in the art have paid little attention to the phosphorus content of austenitic manganese steel weld deposits beyond insuring that the phosphorus content does not exceed the maximum limits prescribed.

We have discovered that austenitic manganese steel weld deposits have important and unforeseeable improved physical characteristics when the phosphorus content is limited to not over about .035%. That is true both in respect of austenitic manganese steel weld deposits unmodified by alloying elements and such weld deposits modified by alloying elements such as nickel, molybdenum and copper. While we prefer to incorporate nickel in our weld deposit, molybdenum or cooper may be substituted for nickel with results markedly superior to the results obtained through the use of welding electrodes containing these same alloying metals but with phosphorus in the conventional range of from about .05% to about .07%. We have also discovered that extra manganese or extra carbon may be substituted for nickel in our weld deposit with results superior to those obtained by the use of commercial austenitic manganese steel welding electrodes containing nickel but having phosphorus in conventional proportions which we have tested. Our invention is also applicable to austenitic manganese steel weld deposits modified by nickel and molybdenum together, by nickel and copper together, by molybdenum and cooper together and by all of nickel, molybdenum and copper together.

We conducted tests to determine the effect of phosphorus content on important properties of austenitic manganese steel weld deposits. The following table shows the results of tests which we made utilizing austenitic manganese steel weld deposits modified with nickel:

| Test Weld Deposit No. | Chemical Composition (percent) | | | | | | Mechanical Properties | | | Armor Weld Crack Test (percent) | |
|---|---|---|---|---|---|---|---|---|---|---|---|
| | C | Mn | Si | P | S | Ni | Tensile Strength (lb./sq. in.) | Elongation (percent) | Character of Fracture | Top | Bottom |
| 1 | .70 | 14.53 | .67 | .012 | .009 | 3.88 | 123,625 | 56 | 100% Fibrous | C | C |
| 2 | | | | .018 | | | 118,875 | 48 | do | C | C |
| 3 | | | | .020 | | | 119,500 | 47 | do | 15 | C |
| 4 | | | | .024 | | | 117,500 | 46 | do | C | 10 |
| 5 | .70 | 14.53 | .62 | {.029 / .031} | .008 | 3.81 | 115,750 | 39 | do | 65 | 30 |
| 6 | | | | {.030 / .034} | | | 83,500 | 15 | {80% Fibrous / 20% Crystalline} | 80 | 35 |
| 7 | | | | .039 | | | 76,875 | 10 | {50% Fibrous / 50% Crystalline} | 99 | 20 |
| 8 | | | | .045 | | | 60,000 | 4 | {25% Fibrous / 75% Crystalline} | 100 | 100 |
| 9 | .71 | 14.40 | .63 | .051 | .009 | 3.83 | Broke during machining | | | 100 | 100 |

C—Crater crack only.

The test weld deposits were prepared utilizing welding electrodes containing progressively increasing quantities of phosphorus introduced as ferrophosphorus, the weld deposits otherwise being conventional nickel-bearing or nickel-modified austenitic manganese steel weld deposits. The carbon content of the weld deposits tested was .70–.71%, the manganese content 14.40–14.53%, the silicon content .62–.67%, the sulphur content .008–.009% and the nickel content 3.81–3.88%. In other words, in all of the test weld deposits the component elements other than phosphorus were present in substantially uniform proportions. The table shows the percentages of all of the component elements in test weld deposits Nos. 1, 5 and 9; only the phosphorus content is shown for the other test weld deposits.

The phosphorus content was increased in steps beginning with test weld deposit No. 1 which contained .012% phosphorus up to test weld deposit No. 9 which contained .051% phosphorus. The phosphorus content obtained by quantitative analysis is not entirely accurate to the third decimal place; as shown with respect to test weld deposits Nos. 5 and 6 two analyses of each such test weld deposits for phosphorus content showed a variation in the percentage of phosphorus. The variation is probably due to a tendency of the phosphorus to segregate to some extent in the weld deposit. Two readings of .029% and .031% were obtained for the phosphorus content of test weld deposit No. 5 and two readings of .030% and .034% were obtained for the phosphorus content of test weld deposit No. 6.

It should be explained that the properties of the test weld deposits vary to some extent with variations in the proportions of the elements other than phosphorus, although the phosphorus content is the characterizing factor in respect of the properties shown in the foregoing table. The table shows an abrupt change in the properties of the test weld deposits when the phosphorus content substantially exceeds about .035%. When the phosphorus content does not exceed about .035% the tensile strength and ductility of the test weld deposits are unforeseeably high, the character of the fracture produced in test is superior and the armor weld crack test shows great superiority. The tensile strength of the test weld deposits decreased rather gradually as the phosphorus content rose from about .012% to about .029–.031% and then decreased abruptly as the phosphorus content became .030–.034%. Likewise the per cent. elongation dropped off abruptly at the same point. When the phosphorus content of the test weld deposits was below about .035% the fractures were all 100% fibrous while with higher phosphorus contents the fractures became progressively crystalline. The armor weld crack test showed an abrupt change in characteristics at about the same point. Unavoidable experimental errors and inaccuracies make it impossible to exactly pinpoint the percentage of phosphorus where the abrupt change in properties occurs, but the test weld deposits containing not over about .035% phosphorus possess exceptionally good properties while those containing substantially more than .035% phosphorus are decidedly inferior.

We have conducted tests giving similar results in respect of test weld deposits modified with molybdenum, test weld deposits modified with copper and unmodified test weld deposits. For test weld deposits modified with nickel, carbon should be in the broad range .40–1.20% with a preferred range of .60–.80%, manganese should be in the broad range 10–18% with a preferred range of 12.5–15% and nickel should be in the broad range 0–6% with a preferred range of 2.5–4%. For test weld deposits modified with molybdenum, carbon should be in the broad range .30–1.20% with a preferred range of .40–.80%, manganese should be in the broad range 10–18% with a preferred range of 12.5–15% and molybdenum should be in the broad range 0–1.75% with a preferred range of 1–1.25%. For test weld deposits modified with copper, carbon should be in the broad range .40–1.20% with a preferred range of .60–.80%, manganese should be in the broad range 10–18% with a preferred range of 12.5–15% and copper should be in the broad range 0–3% with a preferred range of 1.5–2.5%. For unmodified test weld deposits carbon should be in the broad range .40–1.20% with a preferred range of .60–.80% and manganese should be in the broad range 10–20% with a preferred range of 12.5–15%, the proportions of the elements being balanced so that the weld deposit will be of austenitic grain structure.

Thus through our discovery we are able to produce greatly and unforeseeably superior austenitic steel weld deposits by maintaining the phosphorus content not over about .035%. Those skilled in the art have not heretofore discovered the abrupt changes in properties occurring at a phosphorus content of about .035% or appreciated the unforeseeable advantages of maintaining the phosphorus content below about .035%.

While we have described certain present preferred embodiments of the invention it is to be distinctly understood that the invention is not limited thereto but may be otherwise variously embodied within the scope of the following claims.

We claim:

1. A composite comprising a base metal with a weld deposit applied thereto, the weld deposit being of austenitic manganese steel containing not over about .035% phosphorus.

2. A composite comprising a base metal with a weld deposit applied thereto, the weld deposit being of nickel-bearing austenitic manganese steel containing not over about .035% phosphorus.

3. A composite comprising a base metal with a weld deposit applied thereto, the weld deposit being of molybdenum-bearing austenitic manganese steel containing not over about .035% phosphorus.

4. A composite comprising a base metal with a weld deposit applied thereto, the weld deposit being of copper-bearing austenitic manganese steel containing not over about .035% phosphorus.

References Cited in the file of this patent

UNITED STATES PATENTS

| | | |
|---|---|---|
| 2,310,308 | Morrison | Feb. 9, 1943 |

FOREIGN PATENTS

| | | |
|---|---|---|
| 276,048 | Great Britain | Aug. 11, 1927 |